US009478067B1

(12) United States Patent
Worley, III et al.

(10) Patent No.: US 9,478,067 B1
(45) Date of Patent: Oct. 25, 2016

(54) AUGMENTED REALITY ENVIRONMENT WITH SECONDARY SENSORY FEEDBACK

(75) Inventors: William Spencer Worley, III, Half Moon Bay, CA (US); Christopher Coley, Morgan Hill, CA (US); Edwin Joseph Selker, Palo Alto, CA (US); William Thomas Weatherford, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1096 days.

(21) Appl. No.: 13/083,326

(22) Filed: Apr. 8, 2011

(51) Int. Cl.
*G06T 19/00* (2011.01)
*G06T 11/60* (2006.01)
*G06F 3/01* (2006.01)

(52) U.S. Cl.
CPC ............. *G06T 19/006* (2013.01); *G06T 11/60* (2013.01); *G06T 19/00* (2013.01); *G06F 3/011* (2013.01); *G06F 3/016* (2013.01); *H04N 2201/3256* (2013.01)

(58) Field of Classification Search
None
See application file for complete search history.

(56) References Cited

U.S. PATENT DOCUMENTS

| | | | |
|---|---|---|---|
| 7,418,392 B1 | 8/2008 | Mozer et al. | |
| 7,551,161 B2* | 6/2009 | Mann | 345/156 |
| 7,720,683 B1 | 5/2010 | Vermeulen et al. | |
| 7,774,204 B2 | 8/2010 | Mozer et al. | |
| 2004/0070509 A1* | 4/2004 | Grace et al. | 340/575 |
| 2007/0085820 A1* | 4/2007 | Suzuki et al. | 345/156 |
| 2007/0222750 A1 | 9/2007 | Ohta | |
| 2009/0160763 A1* | 6/2009 | Cauwels et al. | 345/156 |
| 2009/0167567 A1* | 7/2009 | Halperin | G08G 5/0021 340/961 |
| 2009/0251421 A1* | 10/2009 | Bloebaum | 345/173 |
| 2009/0303022 A1* | 12/2009 | Griffin et al. | 340/407.2 |
| 2010/0302015 A1 | 12/2010 | Kipman et al. | |
| 2011/0154212 A1* | 6/2011 | Gharpure et al. | 715/738 |
| 2011/0205341 A1 | 8/2011 | Wilson et al. | |
| 2011/0231757 A1* | 9/2011 | Haddick et al. | 715/702 |
| 2011/0317855 A1 | 12/2011 | Andersson et al. | |
| 2012/0194561 A1 | 8/2012 | Grossinger et al. | |
| 2012/0223885 A1 | 9/2012 | Perez | |
| 2013/0265226 A1 | 10/2013 | Park et al. | |

FOREIGN PATENT DOCUMENTS

WO WO2011088053 A2 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

Office Action for U.S. Appl. No. 13/553,531, mailed on Oct. 6, 2014, List et al., "Haptic Feedback for Gesture Interface", 23 pages.

(Continued)

*Primary Examiner* — Jwalant Amin
(74) *Attorney, Agent, or Firm* — Lee & Hayes, PLLC

(57) ABSTRACT

An architecture includes a system to create an augmented reality environment in which images are projected onto a scene and user movement within the scene is captured. In addition to primary visual stimuli, the architecture further includes introduction of a secondary form of sensory feedback into the environment to enhance user experience. The secondary sensory feedback may be tactile feedback and/or olfactory feedback. The secondary sensory feedback is provided to the user in coordination with the visual based activity occurring within the scene.

28 Claims, 11 Drawing Sheets

(56) References Cited

OTHER PUBLICATIONS

Final Office Action dated May 11, 2015 in U.S. Appl. No. 13/553,531, filed Jul. 19, 2012, first named inventor: Timothy T. List, "Haptic Feedback for Gesture Interface".

Office action for U.S. Appl. No. 13/553,531 mailed on Oct. 5, 2015, List et al., "Haptic Feedback for Gesture Interface", 20 pages.

Office action for U.S. Appl. No. 13/553,531, mailed on Apr. 29, 2016, List et al., "Sensory Feedback for Gesture Interface", 35 pages.

* cited by examiner

AUGMENTED REALITY ENVIRONMENT WITH SECONDARY SENSORY FEEDBACK

BACKGROUND

Augmented reality allows interaction among users, real-world objects, and virtual or computer-generated objects and information within an augmented reality environment. Within the augmented reality environment, images may be presented on various objects and users may interact with the images and/or objects in a number of ways. However, in such projection-based environments, there is no tactile or other sensory feedback. Rather, the user experience within the augmented reality environment is often limited to visual interactions. What is desired is to expand the user experience beyond the visual senses.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments are formed through systems of resources such as cameras, projectors, computing devices with processing and memory capabilities, and so forth. The projectors project images onto the surroundings that define the environment and the cameras monitor user interactions with such images.

Described herein is an architecture to create an augmented reality environment in which a secondary form of sensory feedback, in addition to the primary visual stimuli, is introduced into the environment to enhance user experience. The secondary form of sensory feedback may come in many forms including, for example, directed air pressure, focused heat, vibration, wind, haptically-perceptible sound waves, micro projectiles (e.g., water pellets), and so forth. The second sensory feedback may be generated by devices designed to interact with the projection and camera system. Alternatively or additionally, the architecture may leverage other resources found within the environment to deliver the secondary sensory feedback, such as using a user's PDA or cellular phone to generate a synchronized vibration.

The architecture may be implemented in many ways. One illustrative implementation is described below in which an augmented reality environment is created within a room. However, the architecture may be implemented in many other situations.

Illustrative Environment

Figure 1:
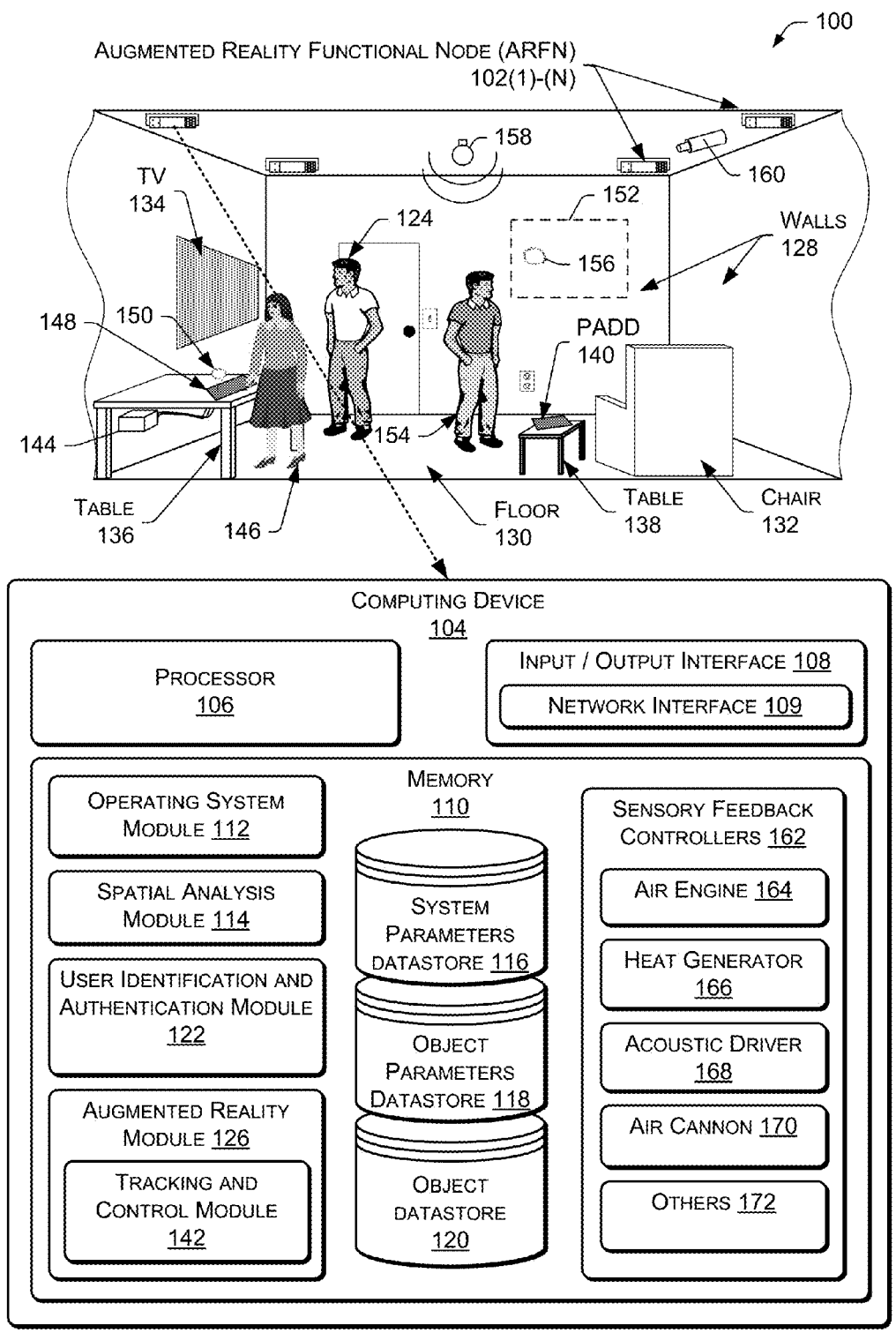
FIG. 1 shows an illustrative scene with an augmented reality environment set in an exemplary room. The augmented reality environment (ARE) is provided, in part, by an augmented reality functional node (ARFN) located in the scene and associated computing device. Secondary sensory devices are also positioned in the scene to generate other forms of non-visible sensory feedback.

FIG. 1 shows an illustrative augmented reality environment 100 created within scene, which in this case is a room. Multiple augmented reality functional nodes (ARFN) 102(1)-(N) contain projectors, cameras, and computing resources that are used to generate the augmented reality environment 100. In this illustration, four ARFNs 102(1)-(4) are positioned around the scene. In other implementations, a single ARFN 102 may be used and positioned in any number of arrangements, such as on the ceiling, in a lamp, on the wall, beneath a table, and so forth. One implementation of the ARFN 102 is provided below in more detail with reference to FIG. 2.

Associated with each ARFN 102(1)-(4), or with a collection of ARFNs, is a computing device 104, which may be located within the environment 100 or disposed at another location external to the environment 100. Each ARFN 102 may be connected to the computing device 104 via a wired network, a wireless network, or a combination of the two. The computing device 104 has a processor 106, an input/output interface 108, and a memory 110. The processor 106 may include one or more processors configured to execute instructions. The instructions may be stored in memory 110, or in other memory accessible to the processor 106, such as storage in cloud-base resources.

The input/output interface 108 may be configured to couple the computing device 104 to other components, such as projectors, cameras, microphones, other ARFNs 102, other computing devices, and so forth. The input/output interface 108 may further include a network interface 109 that facilitates connection to a remote computing system, such as cloud computing resources. The network interface 109 enables access to one or more network types, including wired and wireless networks. More generally, the coupling between the computing device 104 and any components may be via wired technologies (e.g., wires, fiber optic cable, etc.), wireless technologies (e.g., RF, cellular, satellite, Bluetooth, etc.), or other connection technologies.

The memory 110 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instruction, datastores, and so forth may be stored within the memory 110 and configured to execute on a processor, such as the processor 106. An operating system module 112 is configured to manage hardware and services within and coupled to the computing device 104 for the benefit of other modules.

A spatial analysis module 114 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, the examples in this disclosure refer to structured light. The spatial analysis module 114 provides the information used within the augmented reality environment to provide an interface between the physicality of the scene and virtual objects and information.

A system parameters datastore 116 is configured to maintain information about the state of the computing device 104, the input/output devices of the ARFN 102, and so forth. For example, system parameters may include current pan and tilt settings of the cameras and projectors. As used in this disclosure, the datastore includes lists, arrays, databases, and other data structures used to provide storage and retrieval of data.

An object parameters datastore 118 in the memory 110 is configured to maintain information about the state of objects within the scene. The object parameters may include the surface contour of the object, overall reflectivity, color, and so forth. This information may be acquired from the ARFN 102, other input devices, or via manual input and stored within the object parameters datastore 118.

An object datastore 120 is configured to maintain a library of pre-loaded reference objects. This information may include assumptions about the object, dimensions, and so forth. For example, the object datastore 120 may include a reference object of a beverage can and include the assumptions that beverage cans are either held by a user or sit on a surface, and are not present on walls or ceilings. The spatial analysis module 114 may use this data maintained in the datastore 120 to test dimensional assumptions when determining the dimensions of objects within the scene. In some implementations, the object parameters in the object parameters datastore 118 may be incorporated into the object datastore 120. For example, objects in the scene which are temporally persistent, such as walls, a particular table, particular users, and so forth may be stored within the object datastore 120. The object datastore 120 may be stored on one or more of the memory of the ARFN 102, storage devices accessible on the local network, or cloud storage accessible via a wide area network.

A user identification and authentication module 122 is stored in memory 110 and executed on the processor(s) 106 to use one or more techniques to verify users within the environment 100. In this example, a user 124 is shown within the room. In one implementation, the ARFN 102 may capture an image of the user's face and the spatial analysis module 114 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 122 can then match the reconstructed images (or other biometric parameters) against a database of images (or parameters), which may be stored locally or remotely on a storage system or in the cloud, for purposes of authenticating the user. If a match is detected, the user is permitted to interact with the system.

In another implementation, the user identification and authentication module 122 may utilize a secondary test that involves haptic feedback as part of the authentication process. For instance, after analyzing a 3D reconstructed image or other biometric parameters, the user may be presented with shapes projected onto a wall or table surface. The user may be asked to pick out a pre-determined shape known to the user. Such selection may be based on hand motion or physically pointing to the shape. As another example, the secondary indicia may be a sound sequence made by the user, such as two claps followed by a finger snap. This additional indicia may be used as a further test to confirm a user identify.

In another implementation, the room may be equipped with other mechanisms used to capture one or more biometric parameters pertaining to the user, and feed this information to the user identification and authentication module 122. For instance, a scanner may be mounted on the wall or embedded in the ARFN to scan the users fingerprint, or hand profile, or retina. In other implementations, the user may use verbal input and the module 122 verifies the user through an audio profile match. In still other implementations, the use may enter a pass code via a keypad or other input mechanism within the environment 100.

An augmented reality module 126 is configured to generate augmented reality output in concert with the physical environment. The augmented reality module 126 may employ essentially any surface, object, or device within the environment 100 to interact with the user 124. In this example, the room has walls 128, a floor 130, a chair 132, a TV 134, tables 136 and 138, and a projection accessory display device (PADD) 140. The PADD 140 may be essentially any device for use within an augmented reality environment, and may be provided in several form factors, including a tablet, coaster, placemat, tablecloth, countertop, tabletop, and so forth. A projection surface on the PADD facilitates presentation of an image generated by an image projector, such as the projector that is part of an augmented reality functional node (ARFN) 102. The PADD may range from entirely non-active, non-electronic, mechanical surfaces to full functioning, full processing and electronic devices. Example PADDs are described in more detail with reference to U.S. patent application Ser. No. 12/977,949, which is entitled "Powered Augmented Reality Projection Accessory Display Device," and was filed on Dec. 23, 2010, and to U.S. patent application Ser. No. 12/977,992, which is entitled "Unpowered Augmented Reality Projection Accessory Display Device," and was filed on Dec. 23, 2010. These applications are hereby incorporated by reference.

Some of the things in the room may be intended to be part of the augmented reality environment (ARE) upon which images may be projected. Examples of such things may be the walls 128, floor 130, and tables 136, 138, and PADD 140. These items will be referred to as ARE items. Other things may not normally be intended to be part of the augmented reality environment. These items will be referred to generally as non-ARE items. Such non-ARE items may include, for example, the TV 134. However, these non-ARE items may be temporarily used within the augmented reality environment when such devices are accessible, directly or indirectly, by the system of ARFNs 102(1)-(N) and computing devices 104.

Accordingly, the augmented reality module 126 may be used to track not only items within the environment that were previously identified by the spatial analysis module 114, and stored in the various datastores 116-120, but also the non-ARE items that reside in the environment or are ported into the environment. The augmented reality module 126 includes a tracking and control module 142 configured to track one or more ARE and/or non-ARE items within the scene and accept inputs from or relating to the ARE and/or non-ARE items.

The ARFNs 102 and computing components of device 104 that have described thus far may be operated to create an augmented reality environment in which images are projected onto various surfaces and items in the room, and the user 124 (or other users pictured) may interact with the images. The users' movements, voice commands, and other interactions are captured by the ARFNs 102 to facilitate user input to the environment. In addition to this primary visual stimuli within the augmented reality environment, the room is further equipped with devices to provide secondary sensory feedback to the users to enhance the augmented reality experience. The secondary sensory feedback provides signals or information to the user through other non-visual senses, such as tactile senses, olfactory senses, and auditory senses. The secondary sensory feedback may be provided in conjunction with the visual stimuli. Additionally, one or more secondary sensory feedback may be provided in concert with one another to facilitate a full sensory experience for the users.

In this example, the room is equipped with several illustrative devices that provide secondary sensory feedback. An air engine 144 is provided to generate puffs of air in conjunction with a user 146 pressing keys on a virtual keyboard 148 that is projected onto the table 136. The virtual keyboard 148 does not provide any tactile feedback on its own, but the air engine 144 is coordinated by the computing device 104 to output a puff of air 150 proximal to the key being pressed by the user 148 to give a haptic response. This example device is described in more detail with reference to FIG. 4.

A heat generator (not shown) is mounted in a region 152 of the wall 128 to provide tactile feedback in the way of producing zones of differing temperature. A user 154 may touch or move his hand proximal to various parts of the region 152, and these parts may be coordinated to provide a focused heat (or temperature change) in response to user touch or movement. A heat zone 156 is shown within the region 152. A more detailed discussion of this example device is provided below with reference to FIG. 5.

An acoustic wave generator 158 is shown mounted to the ceiling. The acoustic wave generator 158 creates acoustical waves, which may be non-audible to the user, but can still be felt. Such acoustical waves may provide secondary sensory feedback in conjunction with the primary visual stimuli to allow the users to "feel" the simulated situation, making the environment even more real-like.

An pneumatic cannon 160 is shown mounted to the ceiling to direct concentrated air turbulence toward one or more users. The concentrated air turbulence provides a secondary tactile feedback that can be felt by the user. The pneumatic cannon 160 may be positioned by rotational motors to pivot and rotate the barrel so that the concentrated air turbulence may be trained onto a user as he or she moves about the room.

The secondary sensory devices are merely examples. Others may be employed. Additional devices that provide wind, liquid droplets, vibration, and so forth may be employed.

The computing device 104 has one or more sensory feedback controllers 162 to coordinate operation of the devices with the activity being created within the augmented reality environment. Illustrative controllers include an air engine controller 164, a heat generator controller 166, an acoustic driver 168, a pneumatic cannon controller 170, and other controllers 172 for other secondary sensory feedback devices. Each of these controllers synchronizes delivery of the secondary feedback to the user with user interactions within the augmented realty environment. In this manner, the secondary sensory feedback may be used to provide confirmation of user input or activity within in an otherwise visual environment.

Figure 2:
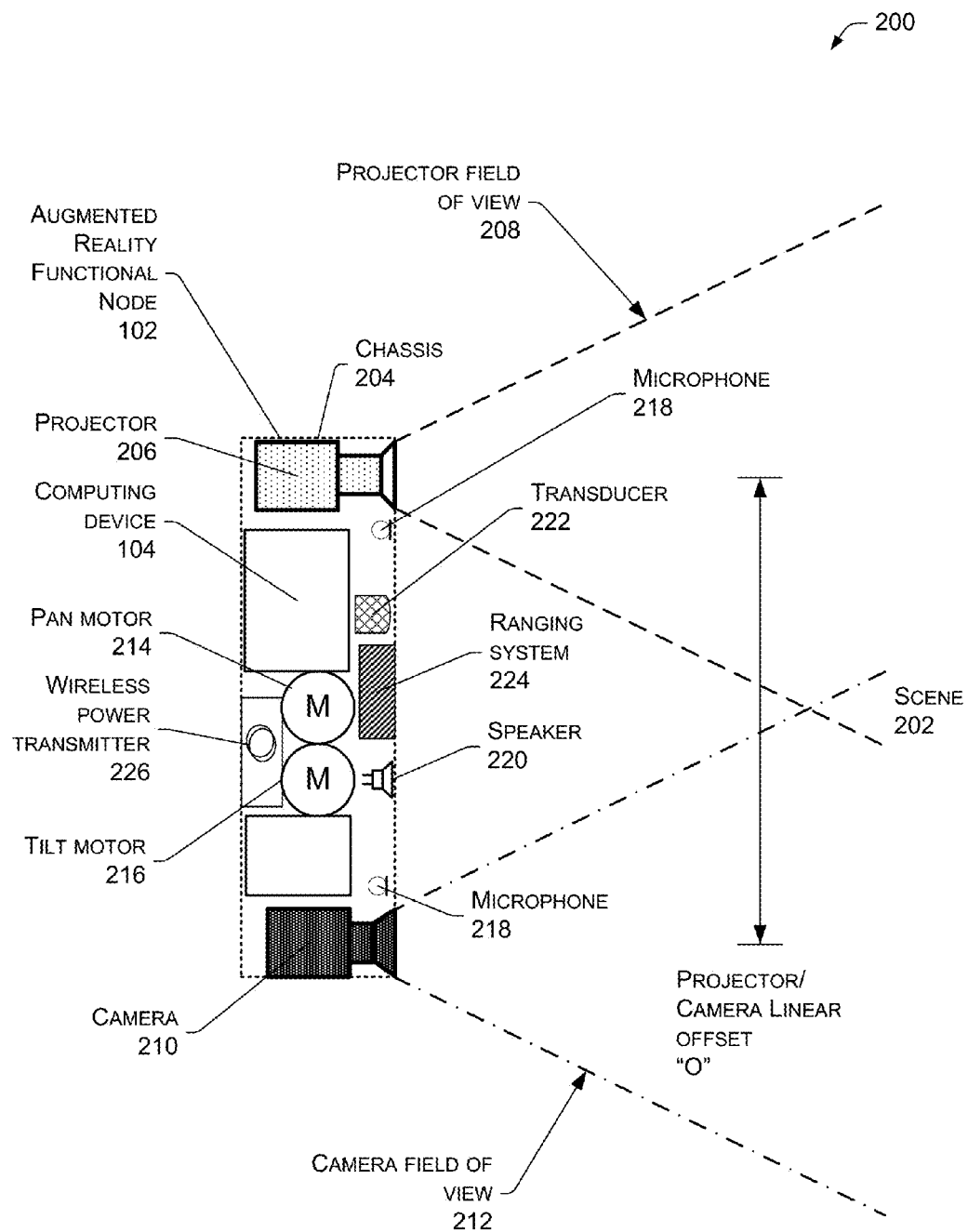
FIG. 2 shows an illustrative augmented reality functional node and computing device, along with other selected components.

FIG. 2 shows an illustrative schematic 200 of the augmented reality functional node 102 and selected components. The ARFN 102 is configured to scan at least a portion of a scene 202 and the objects therein. The ARFN 102 may also be configured to provide augmented reality output, such as images, sounds, and so forth.

A chassis 204 holds the components of the ARFN 102. Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used.

A camera 210 may also be disposed within the chassis 204. The camera 210 is configured to image the scene in visible light wavelengths, non-visible light wavelengths, or both. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 218 may be used to receive voice input from the user for purposes of identifying and authenticating the user. The voice input may be received and passed to the user identification and authentication module 122 in the computing device 104 for analysis and verification.

One or more speakers 220 may also be present to provide for audible output. For example, the speakers 220 may be used to provide output from a text-to-speech module, to playback pre-recorded audio, etc.

A transducer 222 may be present within the ARFN 102, or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102.

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components within the PADD 142. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. Also, the angle of the projector 206 and the camera 210 relative to the chassis 204 may vary.

In other implementations, the components of the ARFN 102 may be distributed in one or more locations within the environment 100. As mentioned above, microphones 218 and speakers 220 may be distributed throughout the scene. The projector 206 and the camera 210 may also be located in separate chassis 204.

Figure 3:
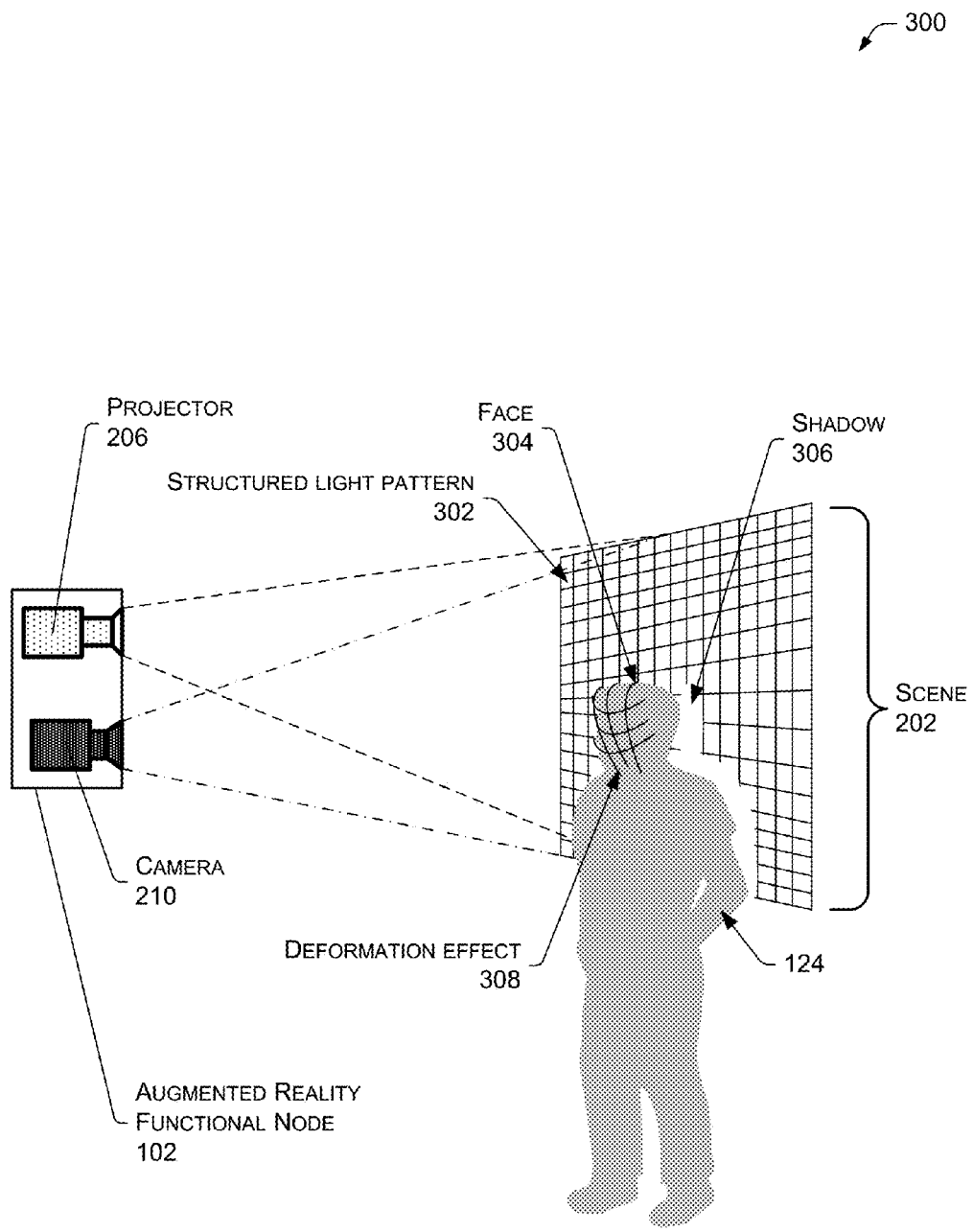
FIG. 3 illustrates the augmented reality functional node projecting a structured light pattern on a scene and capturing a corresponding image of the scene. The node may be configured to perform user identification and authentication.

FIG. 3 illustrates a structured light pattern 300 impinging on the scene 202. In this illustration, the projector 206 within the ARFN 102 projects a structured light pattern 302 onto the scene 202. In some implementations, a sequence of different structure light patterns 302 may be used. This structured light pattern 302 may be in wavelengths which are visible to the user, non-visible to the user, or a combination thereof. The structured light pattern 304 is shown as a grid in this example, but not by way of limitation. In other implementations other patterns may be used, such as bars, dots, pseudorandom noise, and so forth. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 124 is shown within the scene 202 such that the user's face 304 is between the projector 206 and a wall. A shadow 306 from the user's body appears on the wall. Further, a deformation effect 308 is produced on the shape of the user's face 304 as the structured light pattern 302 interacts with the facial features. This deformation effect 308 is detected by the camera 210, which is further configured to sense or detect the structured light. In some implementations, the camera 210 may also sense or detect wavelengths other than those used for structured light pattern 302.

The images captured by the camera 210 may be used for any number of things. For instances, some images of the scene are processed by the spatial analysis module 114 to characterize the scene 202. In some implementations, multiple cameras may be used to acquire the image. In other instances, the images of the user's face 304 (or other body contours, such as hand shape) may be processed by the spatial analysis module 114 to reconstruct 3D images of the user, which are then passed to the user identification and authentication module 122 for purposes of verifying the user.

Certain features of objects within the scene 202 may not be readily determined based upon the geometry of the ARFN 102, shape of the objects, distance between the ARFN 102 and the objects, and so forth. As a result, the spatial analysis module 114 may be configured to make one or more assumptions about the scene, and test those assumptions to constrain the dimensions of the scene 202 and maintain the model of the scene.

Illustrative Secondary Sensory Feedback Devices

Figure 4:
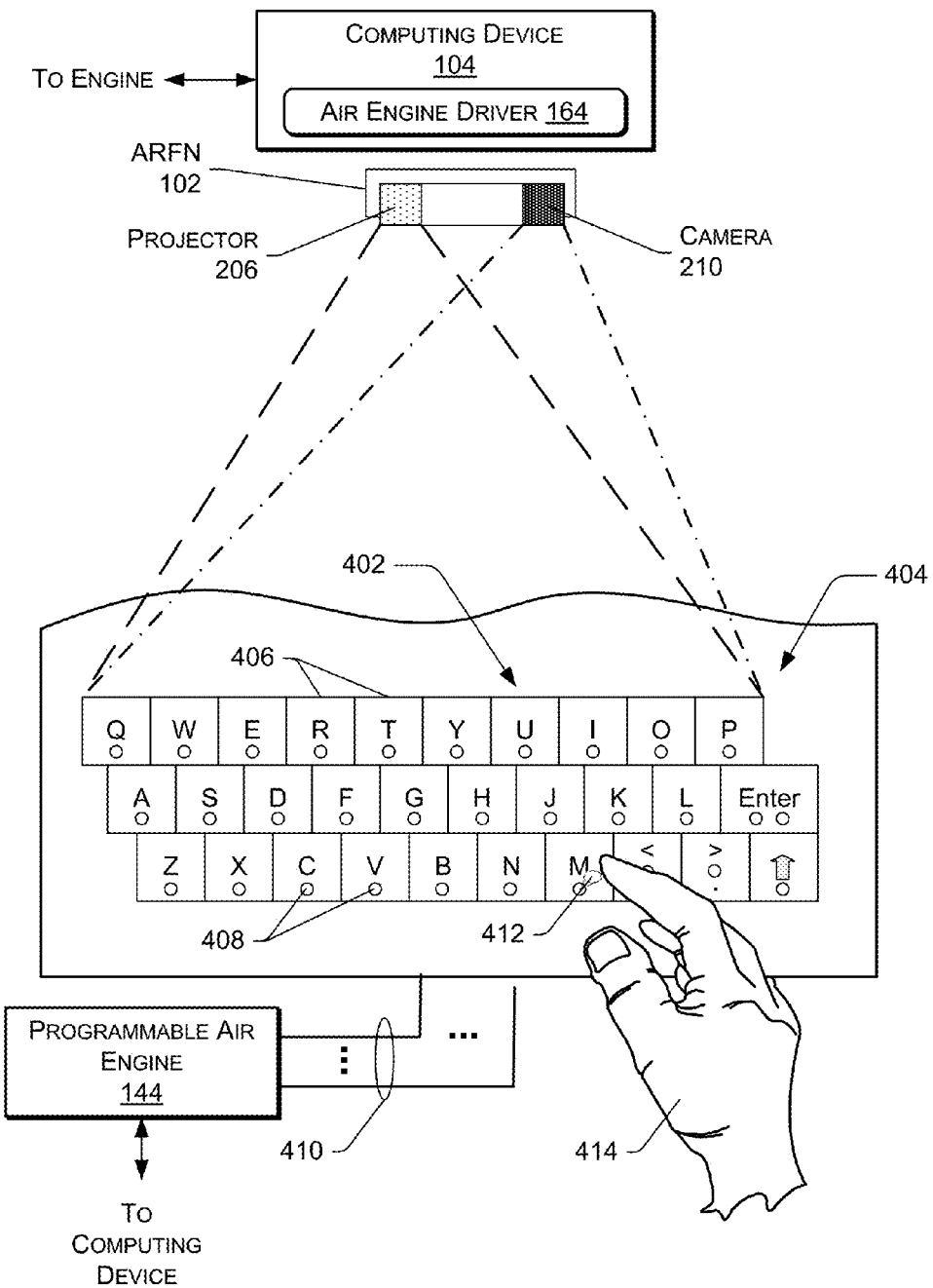
FIG. 4 shows a first illustrative secondary sensory feedback device in the form of a programmable air engine.

FIG. 4 shows a first illustrative secondary sensory feedback device in the form of a programmable air engine 144 that may be used within an augmented reality environment, such as environment 100 in FIG. 1. In this illustration, the projector 206 of the ARFN 102 projects a virtual keyboard image 402 onto a surface 404, such as the surface of the table 136 in FIG. 1. The image is focused to overlay individual keys 406 atop corresponding apertures 408 formed in the surface 404. A set of air tubes 410 interconnect the programmable air engine 144 with individual keys 406. The air engine 144 is configured to individually select ones of the tubes 410 and output small puffs of air 412 through the tubes.

The camera 210 of the ARFN 102 captures movement of the user's hand 414 as it interacts with the virtual keyboard 402. The captured movement is passed to the computing device 104 for processing. If a user's finger is deemed to have "pressed" a particular key 406 in the keyboard 402, the air engine driver 164 directs the programmable air engine 144 to output an air puff 412 through the tube associated with the actuated key. For instance, suppose the computing device 104 determines from the captured image that the user's finger actuated a key for the letter "M". In response, the driver 164 instructs the engine 144 to output a puff of air 412 through the tube 410 and aperture 408 associated with the key "M".

In this manner, a secondary sensory feedback (i.e., a tactile perceptible air puff) is provided to the user when operating the virtual keyboard 402 in addition to any visual feedback that might be created (e.g., color change of key, animated key depression motion, etc.).

Figure 5:
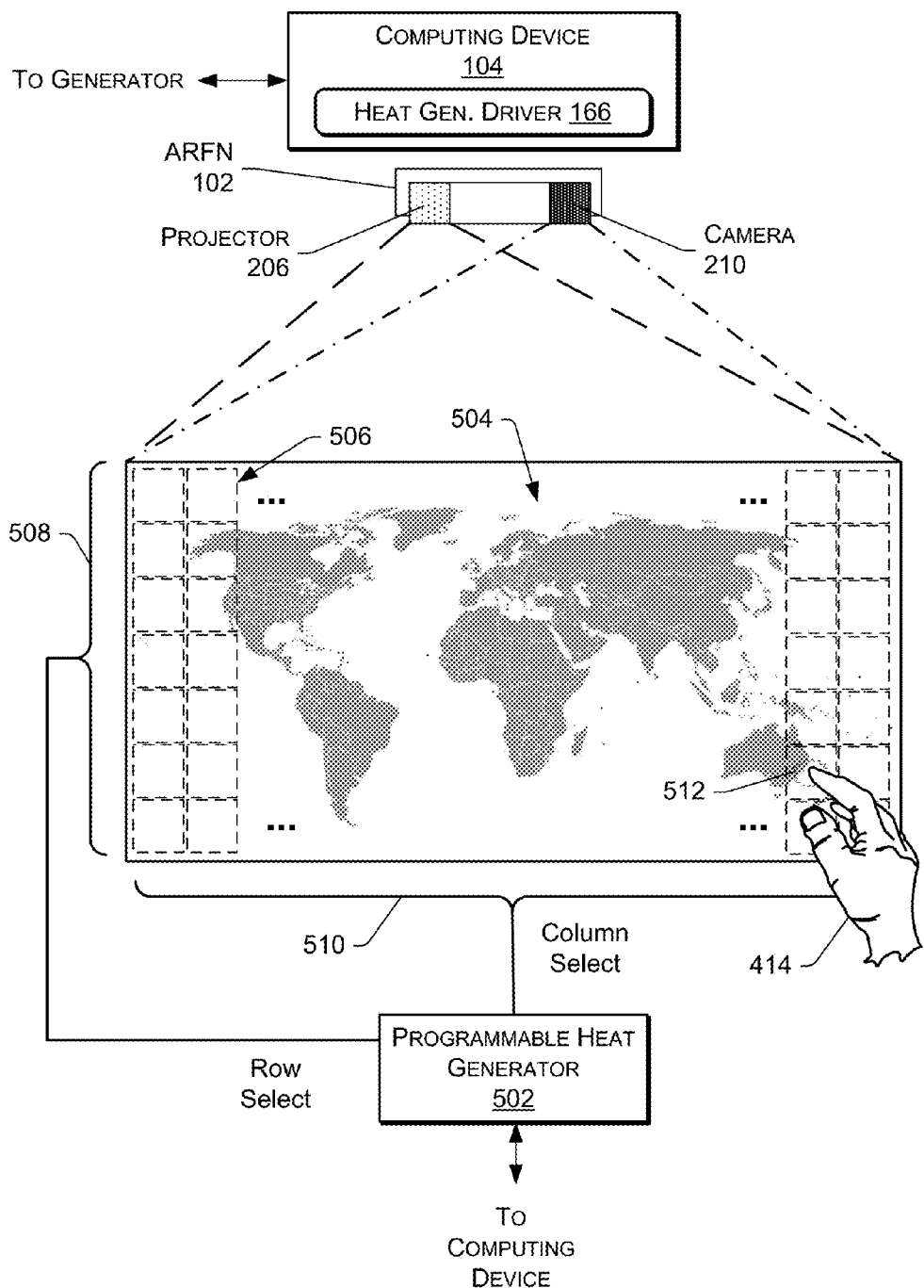
FIG. 5 shows a second illustrative secondary sensory feedback device, this one in the form of a programmable heat generator.

FIG. 5 shows another illustrative secondary sensory feedback device in the form of a programmable heat generator 502 that may be used within an augmented reality environment, such as environment 100 in FIG. 1. In this example, the projector 206 of the ARFN 102 projects an image 504 onto a surface, such as a region 152 of a wall 128 in FIG. 1. Alternatively, it may be projected onto a PADD 140 or other surface. Here, the image 504 is a world map.

The location onto which the image is projected (e.g., wall region 152, PADD 140, etc.) has an associated heat grid 506. The heat grid 506 may be applied to a surface, or hidden just beneath a surface made of a heat conducting material that is safe to touch. The image is focused to cover substantially the entire heat grid 506.

The programmable heat generator 502 is configured to select individual tiles or zones within the heat grid 506 for temperature control. Row select lines 508 and column select lines 510 provide an electrical interface between the grid 506 and generator 502.

The camera 210 of the ARFN 102 captures movement of the user's hand 414 as it interacts with the map image 504. For instance, suppose the user is asked to point to Sydney, Australia. As the user's hand 414 hovers over or touches the map proximal to Sydney, the captured movement is passed to the computing device 104 for processing. The heat generator driver 166 directs the programmable heat generator 502 to generate a focused heat point within a zone 512 of the grid 506.

In this manner, a secondary sensory feedback (i.e., focused heat) is provided to the user when interacting with an image on a surface to provide haptically-perceptible feedback. Coordinating this feedback with the primary visual cues of the map image provides for an enhanced user experience while interacting within the augmented reality environment by letting the user know, for example, that this selection was noted and accurate.

Figure 6:
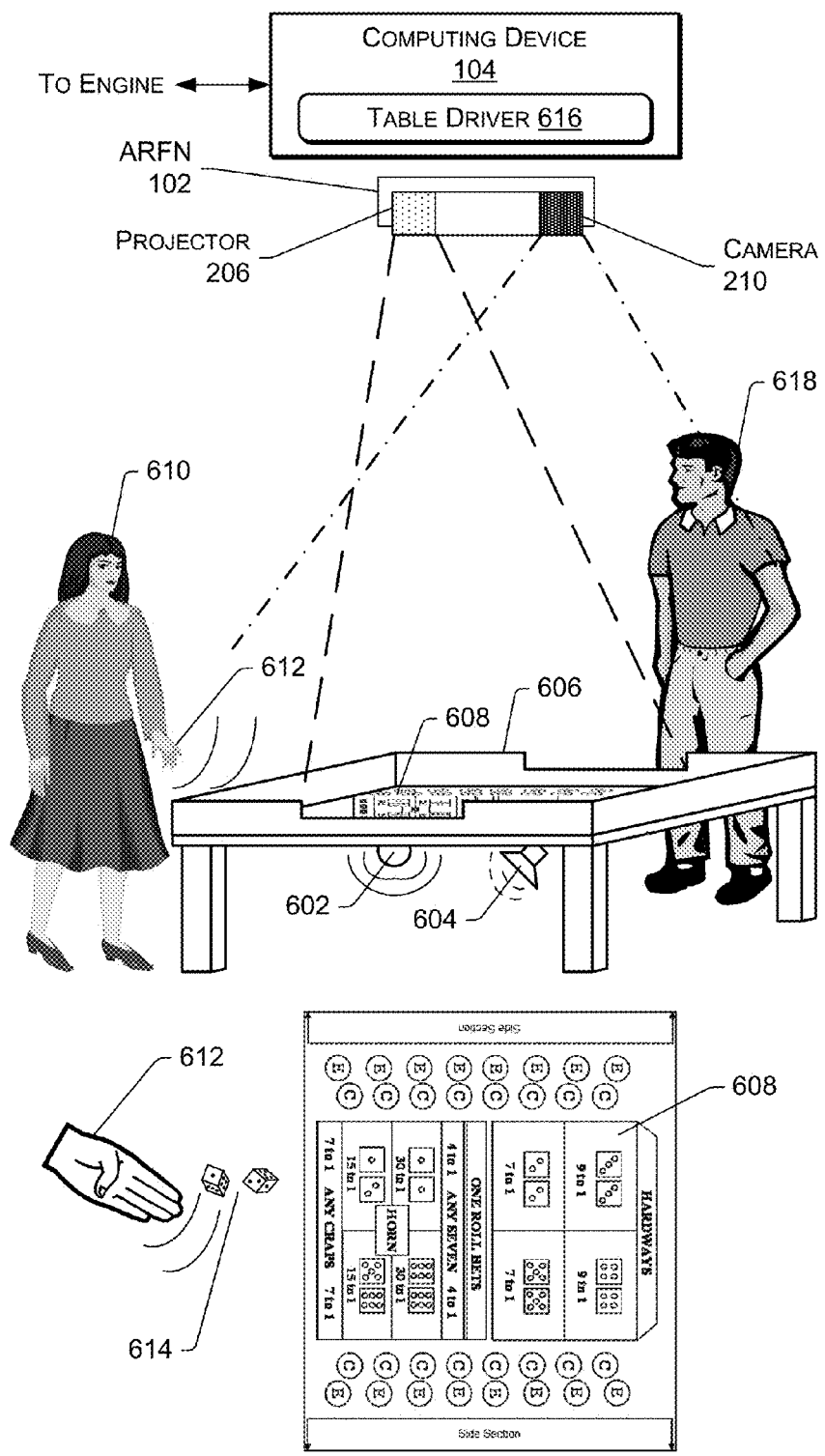
FIG. 6 shows more examples of secondary sensory feedback devices, including a vibration mechanism and a speaker.

FIG. 6 shows other possible illustrative secondary sensory feedback devices, this time in the form of a vibration mechanism 602 and a speaker 604 positioned underneath a table 606. In this illustration, the projector 206 of the ARFN 102 projects an image 608 onto a surface of the table 606. The image is that of a craps board, thereby turning the table 606 into a virtual craps table.

A first person 610 is rolling the dice for this virtual craps game. However, she does not have any physical dice. To start the roll, she makes a motion with her hand 612 as if she were rolling dice at a craps table. The camera 210 captures the hand movement 612 and the computing device 104 interprets this as an intention to roll die. The computing device 104 directs the ARFN 102 (or another one in the room) to visually generate an image of die 614 being rolled across the table. The die image 614 shows the die tumbling as if physical die had been thrown.

In other implementations, the ARFN 102 may further capture certain factors pertaining to the physics of the user's hand during the roll (e.g., movement, rotation, speed, finger orientation at release, etc.) and estimate the speed of the die and rotational spin applied to the die. Various equations may be used to take the input and calculate an approximate path, spin, velocity, and so forth of the die to further improve the perceived reality of the augmented environment.

In addition to this visual stimuli of rolling die, a table driver 616 executing at the computing device 104 directs the vibration mechanism 602 to vibrate the table 606 to simulate physical die tumbling across and the speaker 604 to emit a sound of rolling die. The combination of these secondary sensory feedbacks makes the augmented reality environment seem more authentic to the roller 610 and observer 618.

Figure 7:
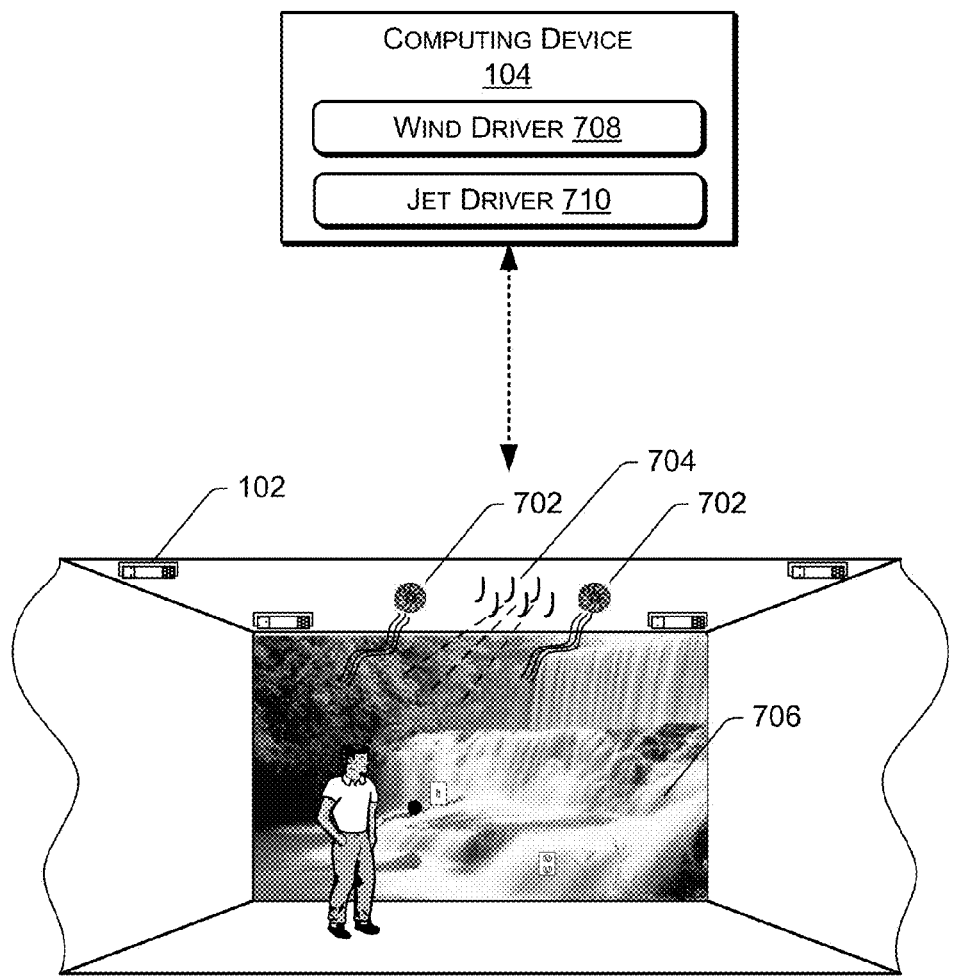
FIG. 7 shows even more examples of secondary sensory feedback devices, including a wind generation mechanism and a liquid jet propellant mechanism.

FIG. 7 shows still more illustrative secondary sensory feedback devices, with this implementation including mechanisms 702 for generating wind and jet mechanisms 704 for projecting small droplets of water (or other safe liquid). In this illustration, the projector 206 of the ARFN 102 projects an image 706 onto a surface, such as a wall. Here, the image 706 is that of a waterfall. In conjunction with this visual image, the computing device 104 includes a wind mechanism driver 708 and jet mechanism driver 710 that direct the mechanisms 702 and 704 to provide tactile feedback in the form of wind and water droplets. In this way, the user's experience within the augmented reality environment is enhanced with the addition of secondary sensory feedback. It is noted that various wind mechanisms may be used. In the illustrated example, a mechanical fan-based mechanism is used. However, an ionic generator may ionize the air to generate air flow with use of mechanical moving blades. The ionic generator may further improve the smell of the environment.

Illustrative Architecture

Figure 8:
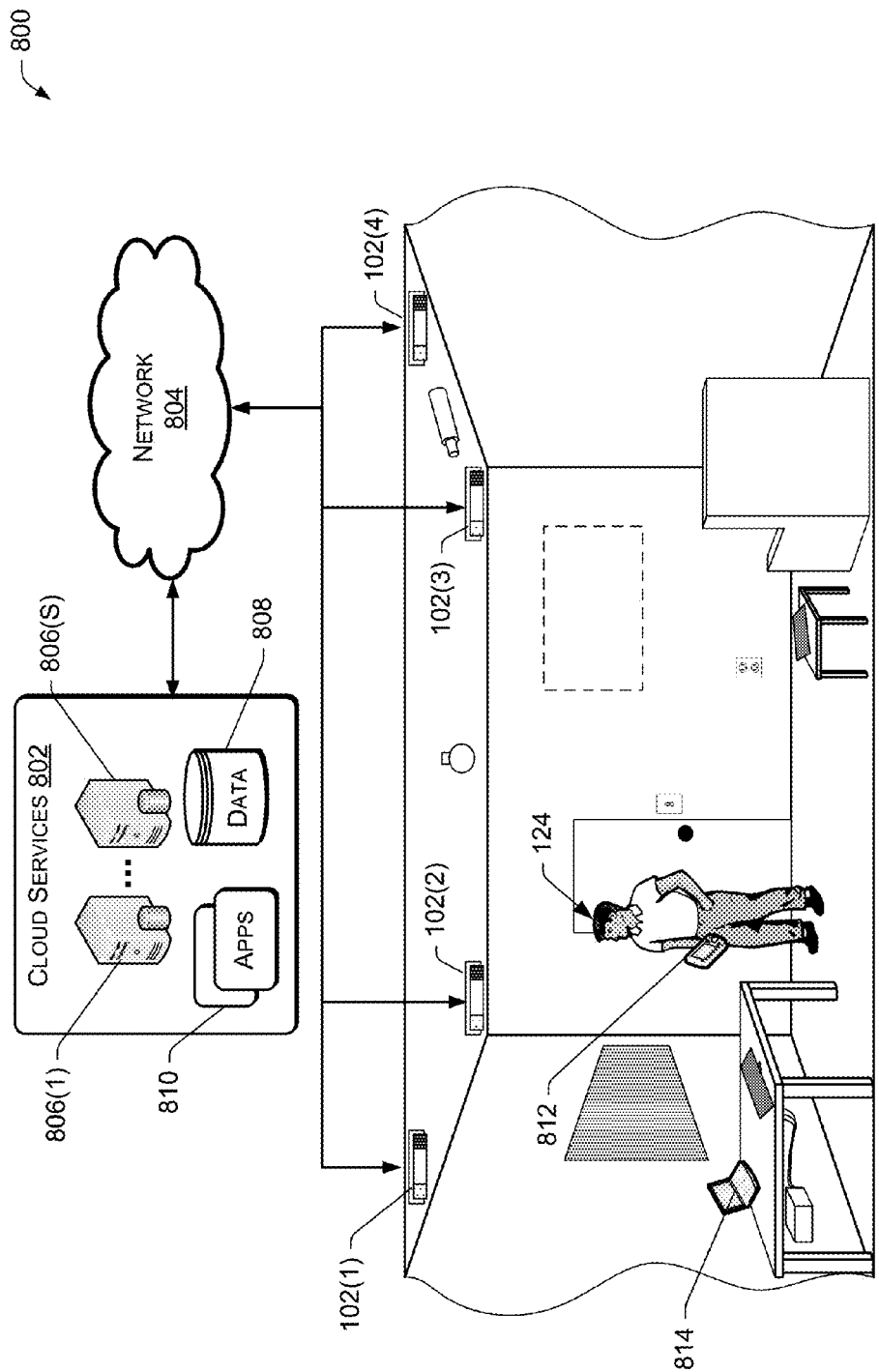
FIG. 8 shows an architecture having one or more ARFNs connectable to cloud services via a network.

FIG. 8 shows an architecture 800 in which the ARFNs 102(1)-(4) residing in the room are further connected to cloud services 802 via a network 804. In this arrangement, the ARFNs 102(1)-(4) may be integrated into a larger architecture involving the cloud services 802 to provide an even richer user experience. Cloud services generally refer to the computing infrastructure of processors, storage, software, data access, and so forth that is maintained and accessible via a network such as the Internet. Cloud services 802 do not require end-user knowledge of the physical location and configuration of the system that delivers the services. Common expressions associated with cloud services include "on-demand computing", "software as a service (SaaS)", "platform computing", and so forth.

As shown in FIG. 8, the cloud services 802 may include processing capabilities, as represented by servers 806(1)-(S), and storage capabilities, as represented by data storage 808. Applications 810 may be stored and executed on the servers 806(1)-(S) to provide services to requesting users over the network 804. Essentially any type of application may be executed on the cloud services 802. One possible application is a user identification and authentication application. This application receives user data from an augmented reality environment, and attempts to verify a specific user from that data. The user data may be an image of certain physical features, such as facial features captured by the ARFN 102. The user data may be a hand profile, or a fingerprint, or a voice file, or a retina scan, or other biometric data, or a pass code. The user data may be processed against a collection of authorized user profiles stored in the data storage 408 to determine whether this particular user should be authorized. In this manner, the cloud services 802 perform the user authentication task in addition, or as opposed, to the ARFN-resident module 122 shown in FIG. 1. Other examples of cloud services applications include sales applications, programming tools, office productivity applications, search tools, mapping and other reference applications, media distribution, social networking, and so on.

The network 804 is representative of any number of network configurations, including wired networks (e.g., cable, fiber optic, etc.) and wireless networks (e.g., cellular, RF, satellite, etc.). Parts of the network may further be supported by local wireless technologies, such as Bluetooth, ultra-wide band radio communication, wifi, and so forth.

By connecting the ARFNs 102(1)-(4) to the cloud services 802, the architecture 800 allows the ARFNs 102 and computing devices 104 associated with a particular environment, such as the illustrated room, to access essentially any number of services. Further, through the cloud services 802, the ARFNs 102 and computing devices 104 may leverage other devices that are not typically part of the system to provide secondary sensory feedback. For instance, user 124 may carry a personal cellular phone or portable digital assistant (PDA) 812. Suppose that this device 812 is also equipped with wireless networking capabilities (wifi, cellular, etc.) and can be accessed from a remote location. The device 812 may be further equipped with an audio output components to emit sound, as well as a vibration mechanism to vibrate the device when placed into silent mode. A portable laptop 814 sitting on the table may also be equipped with similar audio output components or other mechanisms that provide some form of non-visual sensory communication to the user.

With architecture 800, these devices may be leveraged by the cloud services to provide forms of secondary sensory feedback. For instance, the user's PDA 814 may be contacted by the cloud services via a cellular or wifi network and directed to vibrate in a manner consistent with providing a warning or other notification to the user while the user is engaged in an augmented reality environment. As another example, the cloud services 802 may send a command to the computer 814 to emit some sound or provide some other non-visual feedback in conjunction with the visual stimuli being generated by the ARFNs 102.

Figure 9:
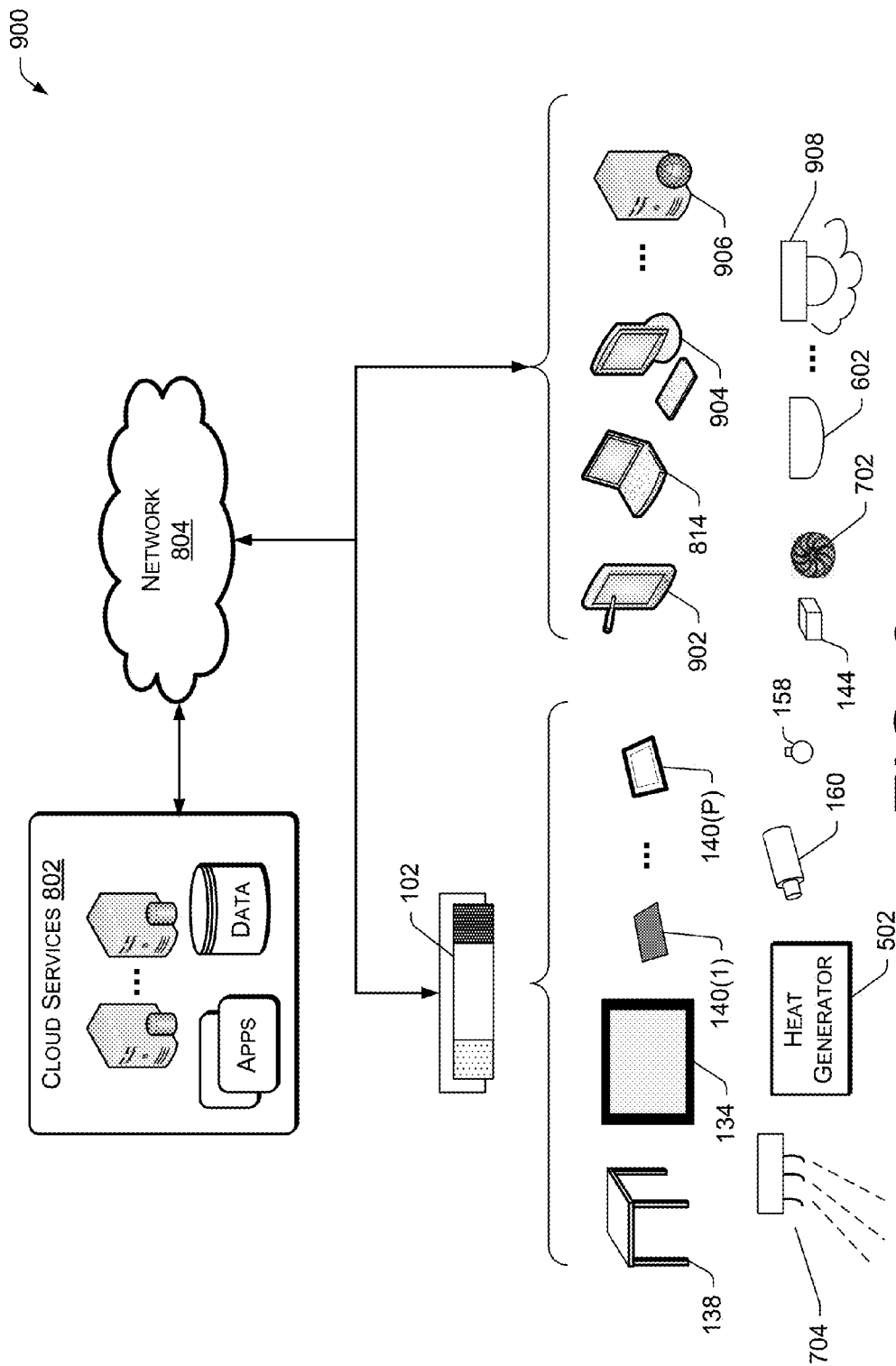
FIG. 9 illustrates an example collection of resources that may be employed in the architecture. These resources include items typically associated with an augmented reality environment, items that are typically not intended for use in such environments, and items designed to provide secondary sensory feedback.

FIG. 9 illustrates an abstraction 900 of the architecture in which an augmented reality environment and any number of resources therein may be leveraged as clients to interact with applications and data provided by the cloud services 802. In this illustration, the cloud services 802 are coupled via the network 804 to a system of ARFNs, as represented by ARFN 102, and/or to resources equipped with network access capabilities. ARE resources that may be employed by the ARFN 102 include essentially any surface onto which an image may be projected and/or any device that may depict an image. Examples include the surface of table 138 and any number of implementations of the PADD 140(1)-(P). As noted above, the PADDs may range from a simple piece of material having a projection surface, to mechanical tablet with some mechanical functionality (e.g., audible sound generation), to a low functioning electronic devices (e.g., limited memory and processing, and remotely powered), to powered electronic devices (e.g., display, processor, memory, etc), to full functioning computing devices.

The architecture may also make use of resources in the augmented reality environments that may not generally be intended for use within the environments. Such non-ARE devices may themselves be leveraged by the architecture through their connection with the cloud services 802 via the network 804 or through some form of communication with the ARFN 102. Representative non-ARE devices include a tablet 902, a portable computer 814, a desktop computer 904, and a server 906. These non-ARE devices may be used to provide primary visual stimuli, such as depicting images on the screens. Alternatively, these non-ARE devices may further provide secondary sensory feedback. For instance, the tablet 902 may be directed at times by the cloud services to provide a vibration or buzzing sensation to offer tactile feedback to the user during part of the augmented reality experience.

The architecture further employs resources designed to deliver secondary sensory feedback. Such resources may be controlled by the ARFN 102 and associated computer 104, or by the cloud services 802, or a combination of the thereof. Representative secondary sensory feedback resources include water jets 704, the heat generator 502, the air cannon 160, the acoustic device 158, an air generator 144, a wind mechanism 702, a vibration mechanism 602, and an olfactory mechanism 908. The olfactory mechanism 908 may be employed to provide a smelling sensation that is detectable by the user's olfactory senses.

Illustrative Process

Figure 10:
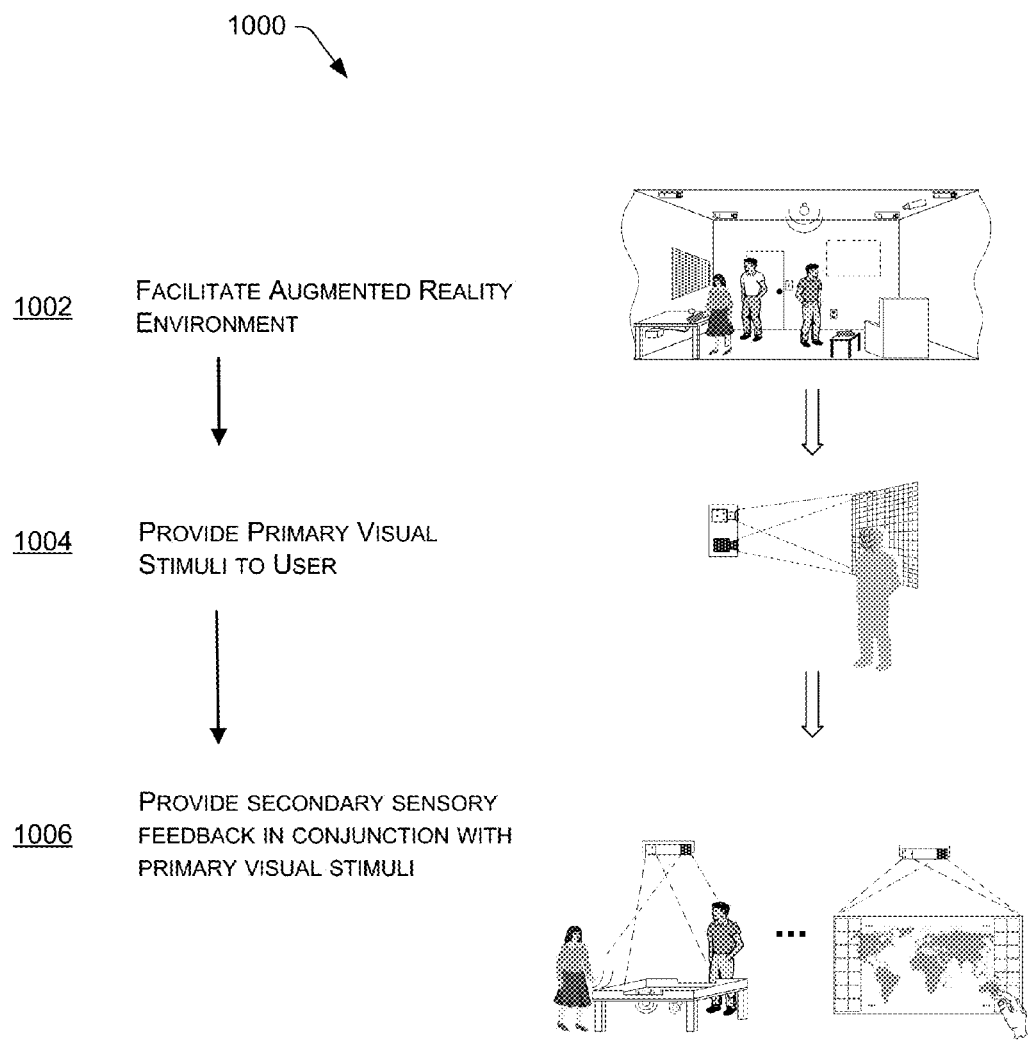
FIG. 10 is a flow diagram showing an illustrative process of providing an enhanced augmented reality environment with use of secondary sensory feedback.

FIG. 10 shows an illustrative process 1000 of providing an enhanced augmented reality environment with use of secondary sensory feedback. The processes described herein, including the processes of FIGS. 10 and 11, may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

At 1002, an augmented reality environment is facilitated within a scene, such as within a room. The augmented reality environment is generated through a combined use of projection and camera resources in which projectors project images onto surroundings that define the environment and cameras monitor user interactions with such images. In one implementation described herein, the augmented reality environment is created by one or more ARFNs 102 and associated computing device 104.

At 1004, the augmented reality environment includes primary visual stimuli in the form images projected onto elements within the scene. These images may be projected onto surfaces (e.g., walls, floor, tables, etc.) or the system may leverage imaging devices (e.g., TVs, computer monitors, etc.) to depict images. The user may interact with the images via hand or body movement, voice commands, and so forth.

At 1006, secondary sensory feedback is also provided in conjunction with the primary visual stimuli. For instance, the secondary sensory feedback may be provided as tactile or olfactory feedback. The tactile feedback may take on any number of forms, such as vibration, air bursts or acoustic waves that can be felt. Other examples include focused heat or water droplets that can be sensed by the user. The secondary sensory feedback is timed and coordinated with the primary visual stimuli to enhance the overall user experience within the augmented reality environment.

Figure 11:
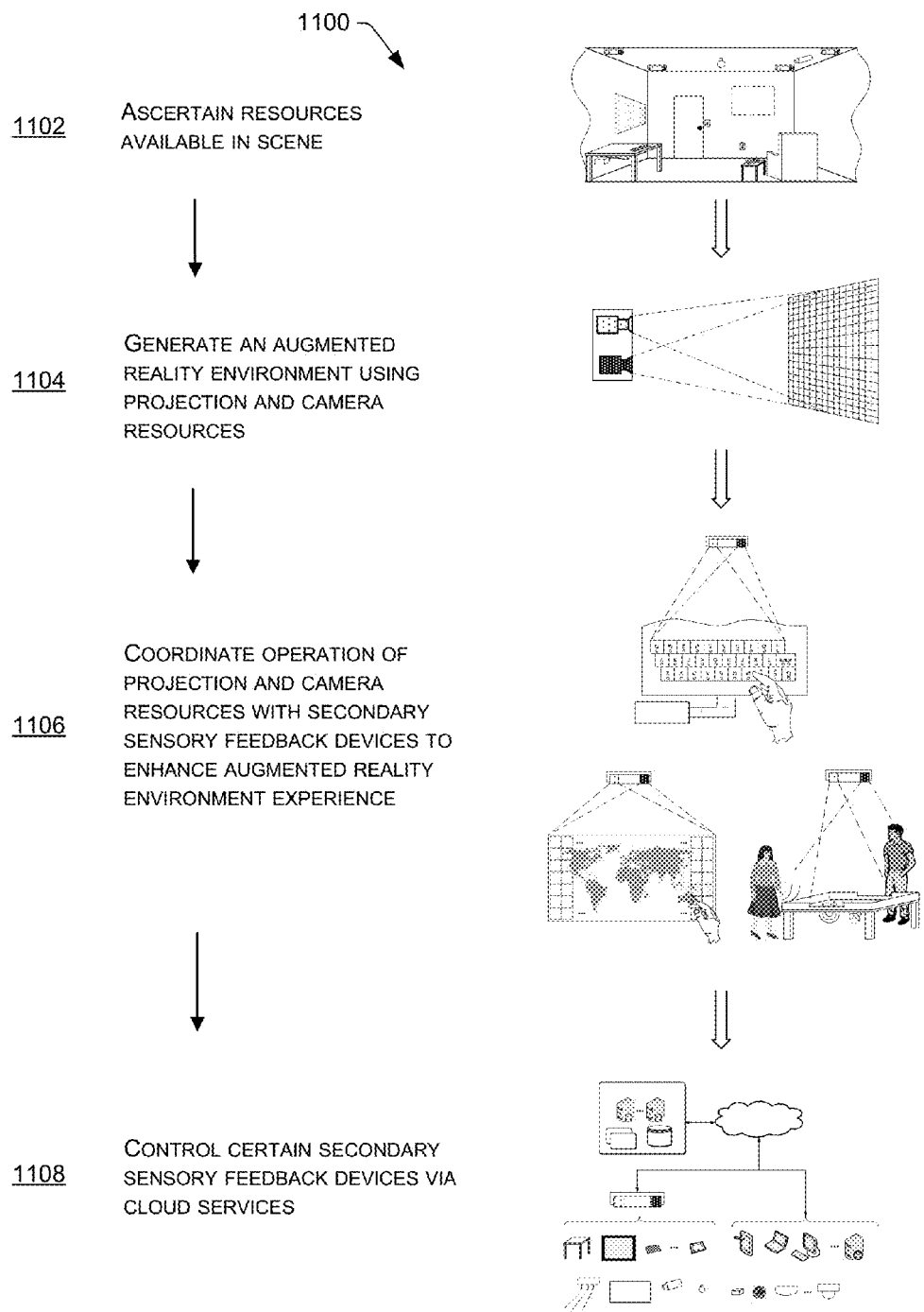
FIG. 11 is flow diagram showing an illustrative process of using an augmented reality environment and resources found therein as clients to cloud services.

FIG. 11 shows an illustrative process 1100 of enhancing an augmented reality environment through use of secondary sensory feedback devices, some of which may be controlled as clients to cloud services.

At 1102, the resources available with the room are ascertained and inventoried. In one implementation, the spatial analysis module 114 analyzes the scene to generate a topology, recognizing objects in the scene, dimensioning the objects, and modeling the scene. The spatial analysis module 114 provides the information used within the augmented reality environment to provide an interface between the physicality of the scene and virtual objects and information. Further, the augmented reality module 126 may take inventory of the types of resources available, such as possible secondary sensory devices that might be available in the room as well.

At 1104, an augmented reality environment is created using the projection and camera resources. For instance, the projector and camera available on each ARFN may be used to project images onto surfaces and objects within the room and capture user interaction with those images.

At 1106, operation of the projection and camera resources to create the augmented reality environment is coordinated with secondary sensory feedback devices. For instance, when providing images and sensing user interaction, certain secondary sensory feedback devices may be employed to provide non-visual feedback to the user, such as tactile or olfactory feedback. Such sensory feedback is timed to provide sensations that enhance the user's experience. For instance, when the user is interacting with a virtual keyboard, the camera captures the user's movement among the keys and determines when the user intentionally presses or otherwise interacts with the keys. In synchronization, an air generation device is directed to output puffs of air proximal to the keys as being engaged by the user. In another example, a user may be interacting with an image on a surface that is additionally coordinated to provide focused heat feedback in response to user proximity or touch. In each of these cases, a tactile form of feedback (secondary to the primary visual output) is produced to give the user more "feeling" while interacting within the environment.

At 1108, certain secondary sensory feedback devices may be controlled via external computing resources, such as cloud services, that are remote from the augmented reality environment. For instance, a tactile feedback for the user may be provided by asking the cloud services to connect with a user device (e.g., a PDA) and request that it initiate a vibration. The user may sense this vibration from the device as part of the augmented reality that she is currently experiencing. For instance, when playing a game or entering an answer, a vibration may be provided to the user's device in response to an adverse gaming event or an incorrect answer. More generally, the resources may include items intended for use within the environment (i.e., ARE resources) and those that are not generally intended for use within the environment (i.e., non-ARE resources). The types of resources range widely, as described above with respect to FIG. 9.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
an augmented reality functional node configured to be positioned within an environment and independent of a user, the augmented reality functional node having a projector and a camera for generating an augmented reality environment, the projector projecting one or more images on one or more surfaces of one or more physical objects within the environment and the camera capturing interaction of a user with the one or more images, the images providing primary stimuli for the user;
a computing device configured to:
determine a plurality of different types of secondary sensory devices available in the environment,
select a secondary sensory device of a first type of the plurality of different types, wherein the secondary sensory device is separate from the augmented reality functional node and separate from the user, and
facilitate coordination between the augmented reality functional node and the secondary sensory device so that secondary sensory feedback is provided from the secondary sensory device to the user in synchronization with the projecting of the one or more images; and
wherein the secondary sensory device is configured to generate the secondary sensory feedback within the augmented reality environment in response to the user interacting with the one or more images projected on the one or more surfaces of the one or more physical objects.

2. The system of claim 1, wherein the augmented reality functional node generates an augmented reality environment through use of structured light.

3. The system of claim 1, wherein the secondary sensory device comprises an air engine device to generate haptically-perceptible puffs of air.

4. The system of claim 1, wherein the secondary sensory device comprises an acoustic device to generate non-audible acoustical waves that provide tactile feedback to the user.

5. The system of claim 1, wherein the secondary sensory device comprises a heat generation device to create zones of focused heat that provide tactile feedback to the user.

6. The system of claim 1, wherein the secondary sensory device comprises an air cannon device to generate concentrated air turbulence that provides tactile feedback to the user.

7. The system of claim 1, wherein the secondary sensory device comprises a vibration device to provide vibration forces as a form of tactile feedback.

8. The system of claim 1, wherein the secondary sensory device comprises a liquid propellant device to release droplets of liquid as a form of tactile feedback.

9. The system of claim 1, wherein the secondary sensory device comprises an olfactory device to release an olfactory-perceptible whiff as a form of olfactory feedback.

10. The system of claim 1, wherein the computing device is associated with the augmented reality functional node.

11. The system of claim 1, wherein the computing device comprises a remote computing system remote from the augmented reality environment.

12. An architecture comprising:
an augmented reality generation system having projection and image capture capabilities to generate an augmented reality environment by projecting structured light on one or more physical objects in an environment and capturing user movement of a user within the structured light in the environment, the augmented reality generation system being positioned in a first location independent of the user;
a computing device configured to: determine a plurality of different types of sensory devices available in the environment, and select one or more sensory devices of a tactile type of the plurality of different types, the one or more tactile sensory devices being separate from the user and positioned in a second location different from the first location of the augmented reality generation system and the one or more tactile sensory devices being operable in cooperation with the augmented reality generation system to provide tactile feedback to the user as the user interacts with the structured light projected on the one or more physical objects within the augmented reality environment; and
a remote computing system having processors and data storage separate from the augmented reality generation system, the remote computing system providing instructions to at least one tactile sensory device to provide the tactile feedback in coordination with the augmented reality environment.

13. The architecture of claim 12, wherein the one or more tactile sensory devices are selected from a group of devices comprising an acoustic device, a pneumatic device, a heat generating device, a liquid propellant device, and a vibration device.

14. The architecture of claim 12, wherein the remote computing system comprises cloud services.

15. The architecture of claim 12, further comprising a user device independent from the one or more tactile sensory devices that is accessible by the remote computing system over a network, the user device being configured to communicate with the remote computing system and provide tactile feedback to the user in response to the user device receiving an instruction from the remote computing system.

16. A method comprising:
projecting, from a first location independent of a user, visually-perceptible images onto surfaces in an environment; determining a plurality of different types of secondary sensory devices available in the environment; selecting a secondary sensory device of a first type of the plurality of different types;
capturing interaction of the user with one or more of the visually-perceptible images; and
generating, from a second location different than the first location and independent of the user, a secondary sensory feedback from the secondary sensory device to provide sensory feedback to the user in coordination with the user interacting with one or more of the visually-perceptible images projected onto the surfaces in the environment.

17. The method of claim 16, further comprising generating an augmented reality environment by projecting structured light onto surroundings within the environment.

18. The method of claim 16, wherein generating a secondary sensory feedback comprises producing haptically-perceptible puffs of air.

19. The method of claim 16, wherein generating a secondary sensory feedback comprises producing non-audible acoustical waves.

20. The method of claim 16, wherein generating a secondary sensory feedback comprises producing focused heat.

21. The method of claim 16, wherein generating a secondary sensory feedback comprises producing vibrations.

22. The method of claim 16, wherein generating a secondary sensory feedback comprises producing droplets of liquid.

23. A method comprising:
projecting, from a first location independent of a user, structured light onto one or more surfaces of physical surroundings within a scene; determining a plurality of different types of sensory devices available in the scene; selecting a sensory device of a tactile type of the plurality of different types;
capturing movement of the user within the scene by detecting deformation of the structured light projected onto the one or more surfaces of the physical surroundings;
receiving input as a result of capturing the movement of the user; and
delivering, from a second location different than the first location and independent of the user, tactile feedback from the sensory device to the user in response to receipt of the input, the tactile feedback being delivered to the user while the user is within the scene.

24. The method of claim 23, wherein delivering tactile feedback comprises producing haptically-perceptible bursts of air.

25. The method of claim 23, wherein delivering tactile feedback comprises producing regions of focused heat.

26. The method of claim 23, wherein delivering tactile feedback comprises producing one of non-audible acoustical waves or vibrations.

27. The method of claim 23, wherein delivering tactile feedback comprises producing droplets of liquid.

28. The method of claim 23, wherein delivering tactile feedback comprises producing tactile feedback through use of an independent device associated with the user.

* * * * *